United States Patent [19]

Sargisson et al.

[11] Patent Number: 4,556,366

[45] Date of Patent: Dec. 3, 1985

[54] PROPELLER ACTUATION SYSTEM

[75] Inventors: Donald F. Sargisson; Clifford M. Toraason, Jr., both of Cincinnati, Ohio

[73] Assignee: General Electric Company, Cincinnati, Ohio

[21] Appl. No.: 542,868

[22] Filed: Oct. 17, 1983

[51] Int. Cl.$^4$ .......................................... B64C 11/44
[52] U.S. Cl. ..................... 416/155; 416/48; 416/DIG. 4
[58] Field of Search ............... 310/67 R, 114, 118, 310/115; 416/155, 48, DIG. 4

[56] References Cited

U.S. PATENT DOCUMENTS

| 2,488,392 | 11/1949 | Forsyth | 416/155 |
|---|---|---|---|
| 2,612,228 | 9/1952 | Forsyth | 170/160.23 |
| 3,473,038 | 10/1969 | Hakkarinen | 416/DIG. 4 |
| 3,900,274 | 10/1975 | Johnston et al. | 416/155 |
| 3,974,396 | 8/1976 | Schonball | 416/DIG. 4 |
| 4,039,848 | 8/1977 | Winderl | 416/DIG. 4 |
| 4,147,945 | 4/1979 | Holz et al. | 310/115 |
| 4,227,860 | 10/1980 | Humphreys | 416/155 |
| 4,277,134 | 7/1981 | Upton, Jr. | 350/96.20 |

FOREIGN PATENT DOCUMENTS

| 580337 | 7/1933 | Fed. Rep. of Germany | 416/DIG. 4 |
|---|---|---|---|
| 712882 | 11/1941 | Fed. Rep. of Germany | 416/155 |
| 848267 | 10/1939 | France | 416/155 |
| 1010914 | 6/1952 | France | 416/155 |
| 395141 | 7/1933 | United Kingdom . | |
| 545305 | 5/1942 | United Kingdom . | |
| 585556 | 2/1947 | United Kingdom . | |
| 603438 | 6/1948 | United Kingdom . | |
| 603450 | 6/1948 | United Kingdom . | |
| 604225 | 6/1948 | United Kingdom . | |
| 1556126 | 10/1979 | United Kingdom . | |

Primary Examiner—Everette A. Powell, Jr.
Attorney, Agent, or Firm—Douglas S. Foote; Derek P. Lawrence

[57] ABSTRACT

A propeller engine system with means for generating electric power within a rotatable hub is disclosed. The means include a shaft extending into the hub so that the hub and shaft are differentially rotatable. Magnetic means are fixed to the shaft and winding means are fixed to the hub so that either rotation of the rotor shaft or hub induces an electric current in the winding means.

10 Claims, 2 Drawing Figures

PROPELLER ACTUATION SYSTEM

The present invention relates to propeller systems, and, more particularly, to electric actuation systems and means for generating electric power used therein.

BACKGROUND OF THE INVENTION

In order to combat rising fuel costs, aircraft engine manufacturers have, in recent years, scrutinized propeller engine systems, and particularly turboprop engines, as alternatives to relatively less efficient turbofan engines. Design of such turboprop engines has focused on propeller system technology. For example, improved performance can be achieved by increasing length and chord size as well as the number of propeller blades.

Each large, fast turning blade must have means for pitch changing and deicing. This may require electrical energy of twenty to forty horsepower in the hub of such turboprop engines. In the past, when electric pitch changing was employed, electrical energy was on the order of a few horsepower. The energy required by the actuating motor could be satisfied by generating electricity in the nonrotating section of the engine and transferring to the rotating hub by means of a slip ring. Alternatively, the rotating boundary itself could be the site of energy generation as shown in Johnston, U.S. Pat. No. 3,900,274. Johnston discloses a magnetic source on the nonrotating engine section which induces a current in a winding mounted on the rotating hub.

Both of the above described means for supplying electrical energy to the hub are workable when energy demands are low. However, both would be unduly heavy if sized to supply power in the twenty to forty horsepower range.

The control means for such turboprop engines are typically located outside the rotating hub. Pitch changing operations are thereby controlled by command signals generated outside the hub. Failure of either the outside power supply or the control means could result in the loss of the pitch changing function.

OBJECTS OF THE INVENTION

It is an object of the present invention to provide a new and improved propeller actuation system.

It is another object of the present invention to provide new and improved means for generating electric power in the rotating hub of a propeller engine system.

It is a further object of the present invention to provide new and improved autonomous propeller system in which power generation and speed control are contained within the rotating hub of a propeller engine.

SUMMARY OF THE INVENTION

According to the present invention a rotatable hub has means for generating electric power within the hub. The means comprise a shaft extending into the hub so that the hub and shaft are differentially rotatable. The means further comprise generator means including magnetic means fixed to the shaft and winding means fixed to the hub for rotation therewith. The differential rotation of hub and shaft induces an electric current in the winding means.

In a specific form of the present invention, a rotatable hub in a propeller engine system is operatively connected to the engine drive shaft through gearing means. Means for generating electric power are located within the hub. These means include a high speed rotor shaft extending through the gearing means into the hub. These means further include magnetic field producing means fixed to the rotor shaft and rotatable therewith, and winding means magnetically coupled to the magnetic means and fixed to the hub for rotation therewith. The rotation of the rotor shaft or hub induces an electric current in the winding means.

DETAILED DESCRIPTION OF THE INVENTION

Figure 1:
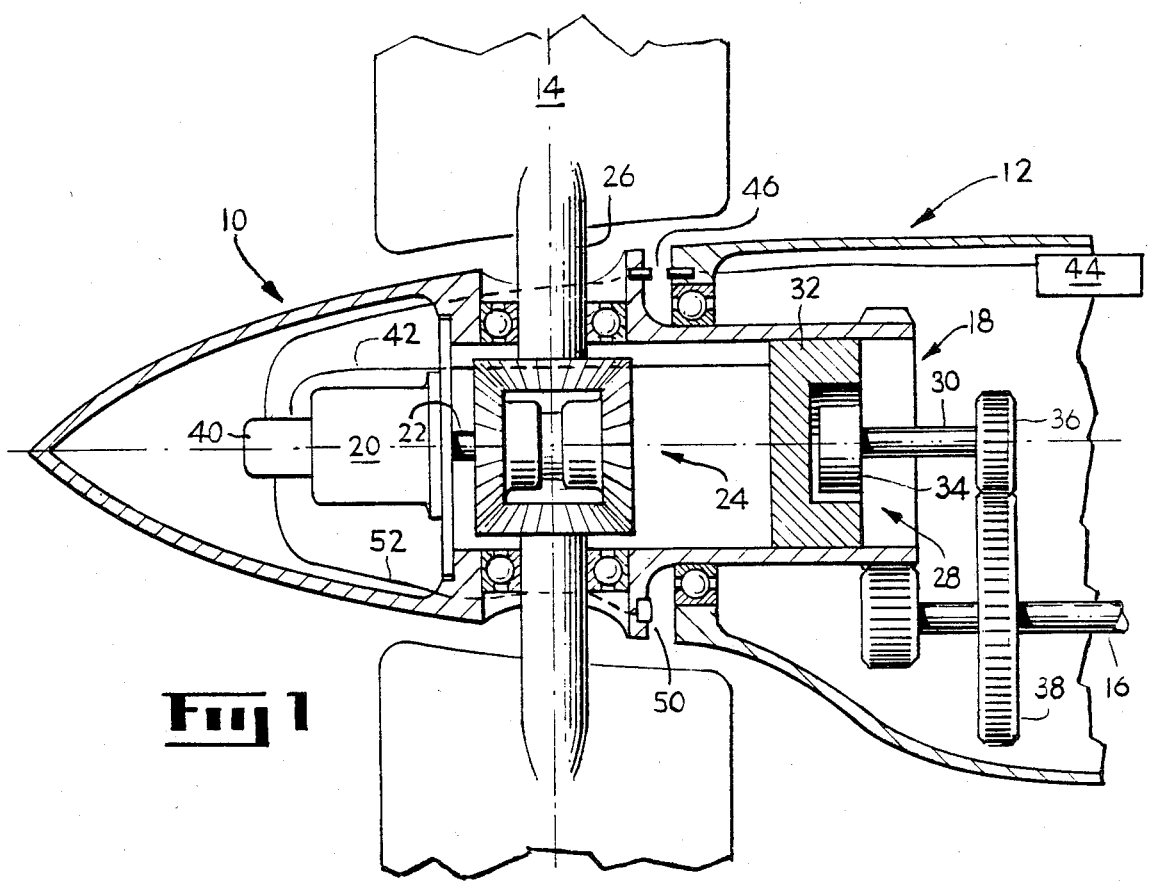
FIG. 1 is a cross-sectional view of a propeller system according to one form of the present invention.

FIG. 1 shows a cross-sectional view of the forward portion of a propeller engine system with rotatable hub 10 and nonrotating or static frame 12. Hub 10 is operatively connected to the engine drive shaft 16 through gearing means 18. Drive shaft 16 is part of the engine power train and may, for example, be driven by a power turbine (not shown). Circumferentially disposed about hub 10 and rotatable therewith are variable pitch propeller blades 14. Variability of blade pitch is necessary to control the propulsive force delivered by blades 14.

Inside rotating hub 10 an actuation system is shown. The system includes an electric actuator motor 20 which has a motor output shaft 22. Shaft 22 is connected to gear reduction means 24 which turns shank 26 of blade 14 for pitch control. Gear reduction means, such as shown in FIG. 1, are well known in the art. The essential characteristics of gear reduction means 24 are that it operatively connects actuator motor 20 to blades 14 and provides the appropriate speed reduction. It should be noted that motor 20 and motor shaft 22, as well as gear reduction means 24 and propeller blades 14 each rotates with hub 10. Consequently, each is fixed relative to the others so that blade actuation occurs only when motor 20 is energized.

The actuation system further includes generator means 28 driven in part by rotor shaft 30. Generator means 28 includes magnetic field-producing means 34, for example permament magnets, and winding means 32 magnetically coupled to said magnetic means. What is meant by "winding means" is any conductive material capable of generating an electromotive force in response to a time-changing magnetic field. Winding means 32 are fixed to hub 10 and rotate therewith. Magnetic means 34 are fixed to rotor shaft 30 and are rotatable therewith. Rotor shaft 30 extends from a position aft of hub 10, through gearing means 18 and into hub 10. In the embodiment shown in FIG. 1, the aft end of rotor shaft 30 is attached to pinion gear 36 which engages gear 38 on engine drive shaft 16. Rotor shaft 30 does not rotate with hub 10. Rather, the two rotate independent of each other and are, therefore, differentially rotatable. In a preferred embodiment, shaft 30 will be a high speed rotor shaft, meaning that its rate of rotation exceeds that of the hub. Shaft 30 need not be driven by engine drive shaft 16 through gears 36 and 38 as described above, but, alternatively, it could be driven directly by the main engine drive shaft.

The actuation system may also include appropriate electrical connections and control means. Electrical power from generator means 28 is delivered to motor control means 40 by electrical connection 42. Control means includes engine control means 44 located outside the rotating hub 10, motor control means 40 located inside the hub and signaling means 46 for transmitting signals from engine control means 44 to motor control means 40. In one form of the present invention, signaling means 46 comprises a fibre optic rotary coupler. However, alternative signaling means such as electrical signals through conventional slip rings, RF transmission, or magnetic induction are within the scope of the invention.

Another feature of the invention employs speed sensor 50 located in the aft portion of hub 10 and positioned so as to view static frame 12. The function of speed sensor 50 is to measure the rotational speed of hub 10 to which it is attached. This information is transmitted to motor control 40 by means of electrical connection 52. Speed sensors are well known in the art and may employ optical, magnetic, or other appropriate technology.

In operation, drive shaft 16 acting through gearing means 18 rotates hub 10, blades 14 and the various components of the actuation system within hub 10. Furthermore, the above elements rotate as a unit, that is, at the same rate. In contrast, rotor shaft 30 together with magnetic means 34 rotates at a different rate. This differential rotation induces an electric current in winding means 32. The amount of current produced is a function of the magnitude of differential rotation. For applications in the twenty to forty horsepower range rotor shaft 30 will be high speed relative to hub rotation. For example rotor shaft 30 may rotate at 20,000 to 30,000 RPM while hub speed may be on the order of 1100 RPM. It should be clear that an electric current will be induced in winding means 32 when either rotor shaft 30 or hub 10 rotates.

Winding means 32 is electrically connected to motor control 40 by electrical connection 42. Motor control 40 controls electrical energy to actuator motor 20 after receiving the appropriate signal from engine control 44 or speed sensor 50 when operating autonomously. Engine control means generate pitch control signals in response to various system parameters. In a preferred embodiment, the former signals will be sent by fibre optic signals which cross the nonrotating/rotating interface by means of an optical slip ring. When energized, motor 20 turns motor shaft 22 which drives gear reduction means for changing the pitch of blade 14.

The actuation system described above is capable of being controlled by engine control means 44 or by autonomous means contained within hub 10. In the autonomous mode, a predetermined signal or lack thereof is received by motor control means 40. This signal will direct motor control means 44 to commence the autonomous mode by maintaining rotational speed at a preselected or transmitted level. Motor control means 40 will then receive hub speed signals from speed sensor 50. Motor control means 40 will regulate blade pitch independently of engine control means 44 so as to maintain a relatively constant hub speed. Autonomous mode will terminate when a deactivate signal or cessation of the activate signal, whichever is programmed, is recevied from engine control means 44. Many possibilities for control systems will now occur to those skilled in the art. By having power generation and control in the hub, autonomous control and redundancy of control superior to existing systems is achievable.

Additional possibilities exist for use of electrical energy thus generated and for control of the propeller system. For example, blade deicing can be achieving by routing the electrical current through appropriately located heating coils. The deicing function can be regulated by motor control 40 on a timeshare basis with pitch changing. It is probably preferred that pitch changing have priority with deicing occurring at other times.

Figure 2:
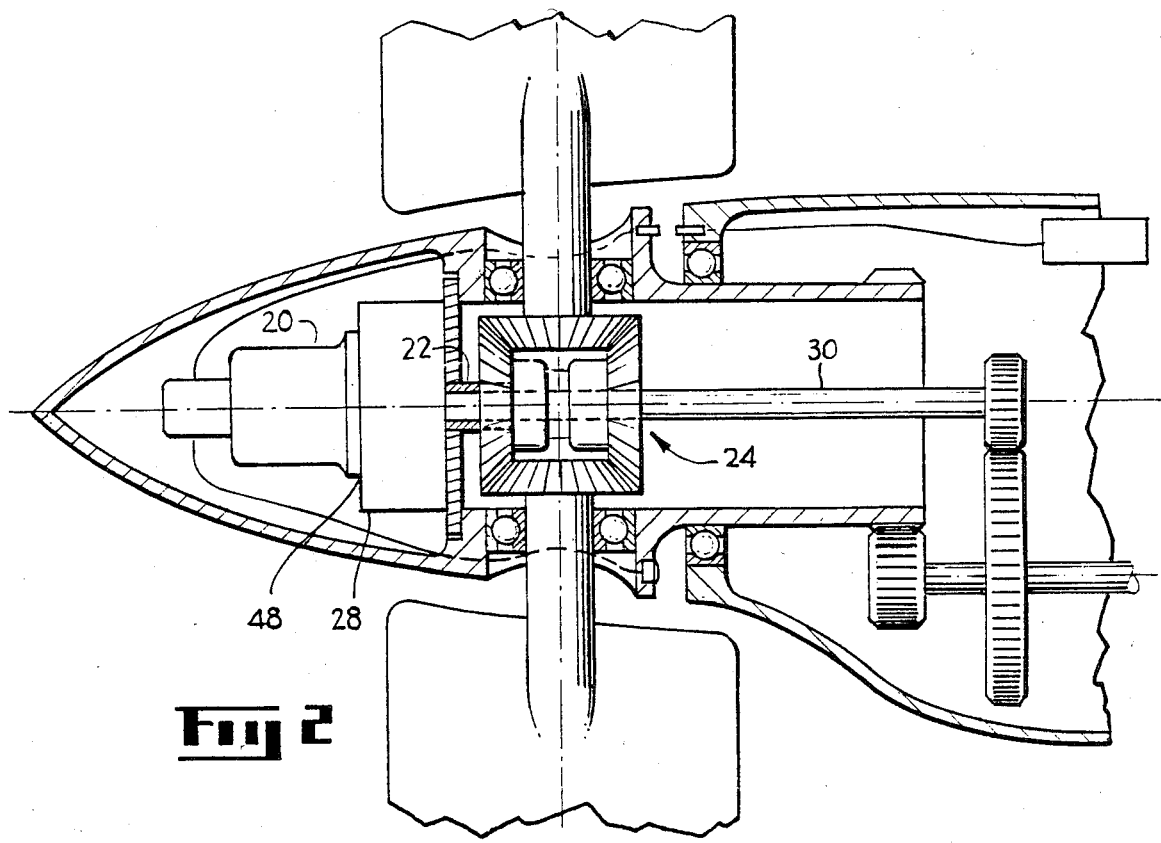
FIG. 2 is a cross-sectional view of a propeller system according to an alternative form of the present invention.

FIG. 2 shows a view of a propeller system according to an alternate form of the invention. Power unit 48 combines actuator motor 20 and generator means 28 within a single housing. Generator means 28 are located axially forward of gear reduction means 24. Output shaft 22 connected to gear reduction means 24 is coaxial with rotor shaft 30. Numerous other configurations of motor 20 and generator means 28, that is, alternative placement of these components within the rotating hub are envisioned.

It will be clear to those skilled in the art that the present invention is not limited to the specific embodiments described and illustrated herein. Rather, it applies equally to actuation systems within any rotating framework. For example, helicopter heads and similar rotor blade systems are within the scope of the present invention. Accordingly, the term "propeller engine system", as used herein, is intended to include such applications. Additionally, many different physical arrangements of generator means and actuator means are within the scope of the present invention.

It will be understood that the dimensions and proportional and structural relationships shown in the drawings are illustrated by way of example only and these illustrations are not to be taken as the actual dimensions or proportional structural relationships used in the actuation system of the present invention.

Numerous modifications, variations, and full and partial equivalents can be undertaken without departing from the invention as limited only by the spirit and scope of the appended claims.

What is desired to be secured by Letters Patent of the United States is the following:

We claim:

1. In a propeller engine system having a rotatable hub including propeller blades, means for generating electric power within said hub for use with said blades comprising:
   a rotor shaft extending into said hub, wherein said hub and said rotor shaft are differentially rotatable; and
   generator means including magnetic means fixed to said rotor shaft and winding means fixed to said hub for rotation therewith;
   wherein said differential rotation induces an electric current in said winding means.

2. In a propeller engine system having a rotatable hub with variable pitch propeller blades, said hub being operatively connected to the engine drive shaft through gearing means, means for generating electric power within said hub for actuating said blades comprising:
   a high speed rotor shaft driven by said engine drive shaft extending through said gearing means into said hub;
   magnetic means fixed to said rotor shaft and rotatable therewith; and
   winding means fixed to said hub for rotation therewith, wherein the rotation of said rotor shaft or said hub induces an electric current in said winding means.

3. In a propeller engine system having a static frame and a rotatable hub with variable pitch propeller blades, said hub being operatively connected to the engine drive shaft through gearing means, an actuation system for said blades comprising:

an electric actuator motor, mounted within said hub for rotation with said hub, with output shaft operatively connected to said blades for pitch control;

a high speed rotor shaft extending through said gearing means into said hub; and generator means including magnetic field-producing means fixed to said rotor shaft and rotatable therewith, and winding means magnetically coupled to said magnetic means, fixed to said hub for rotation therewith and electrically connectable to said motor;

wherein the rotation of said rotor shaft or said hub induces an electric current in said winding means.

4. An actuation system, as recited in claim 3, further comprising control means for regulating the pitch of said propeller blades; said control means including:

motor control means located within said hub for controlling the electrical energy to said motor;

engine control means located within said static frame for generating pitch control signals in response to engine parameters; and signaling means for transmitting said signals from said engine control means to said motor control means.

5. An actuation system, as recited in claim 4, wherein said control means further includes a speed sensor for measuring the rotational speed of said hub;

said motor control means being adapted to receive hub speed signals from said speed sensor and regulate said blade pitch independently of said engine control means so as to maintain a relatively constant hub speed.

6. An actuation system, as recited in claim 4, wherein said signaling means includes a fibre optic rotary coupler.

7. An actuation system, as recited in claim 3, further comprising gear reduction means for operatively connecting said actuator motor to said variable blades.

8. An actuation system, as recited in claim 7, wherein said rotor shaft penetrates said gear reduction means.

9. An actuation system, as recited in claim 7, wherein said generator means is located between said gearing means and said gear reduction means.

10. An acutation system, as recited in claim 7, wherein said generator means is located forward of said gear reduction means.

* * * * *